J. A. PILCHER.
SIX WHEEL CAR TRUCK.
APPLICATION FILED APR. 2, 1914.

1,178,098.

Patented Apr. 4, 1916.

Witnesses
V. Frederiksen.
M. H. Martin.

Inventor
John A. Pilcher,
by Parker Cook
atty.

UNITED STATES PATENT OFFICE.

JOHN A. PILCHER, OF ROANOKE, VIRGINIA.

SIX-WHEEL CAR-TRUCK.

1,178,098.  Specification of Letters Patent.  Patented Apr. 4, 1916.

Application filed April 2, 1914. Serial No. 829,025.

*To all whom it may concern:*

Be it known that I, JOHN A. PILCHER, a citizen of the United States, and a resident of Roanoke, county of Roanoke, and State of Virginia, have made and invented certain new and useful Improvements in Six-Wheel Car-Trucks, of which the following is a specification.

My invention relates to a new and useful improvement in six wheel car trucks and more specifically to the form of bolster and the location of the side bearings thereon.

Heretofore as far as I am aware in six wheel trucks the general practice has been to locate the side bearings either out beyond the side frames or directly over the same. I have found however that with the construction of the bolster and truck to be hereinafter fully described, that the desirable and most economical place for the side bearings is at the ends of the side pieces of the bolster and wholly within the side frames of the truck.

An object therefore of my invention is to provide a six wheel truck having a particular form of bolster; side bearings located on said bolster and located within the side frames of said truck.

Another object of my invention is to provide a six wheel truck with a particular form of bolster; side bearings located on said bolster and within the side frames but at as great a distance as necessary from the center plate of said bolster.

With these and other objects in view my invention consists in certain new and novel constructions and combination of parts as will be hereinafter fully described and pointed out in the claims.

Figure 1:
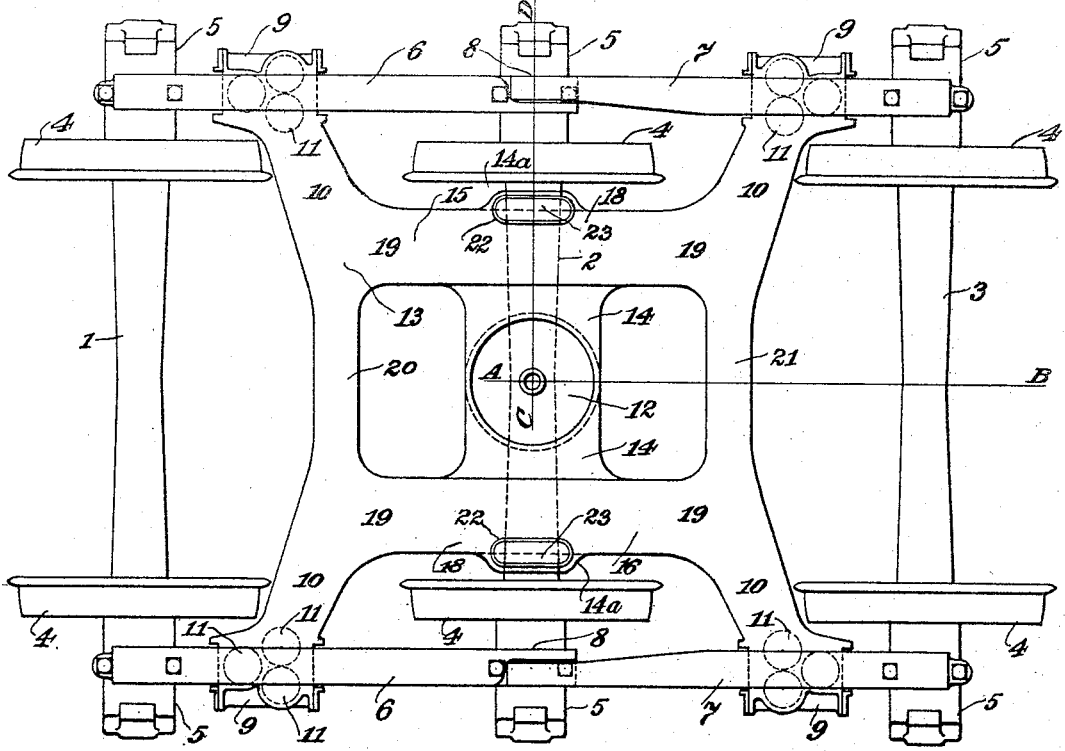
Figure 2:
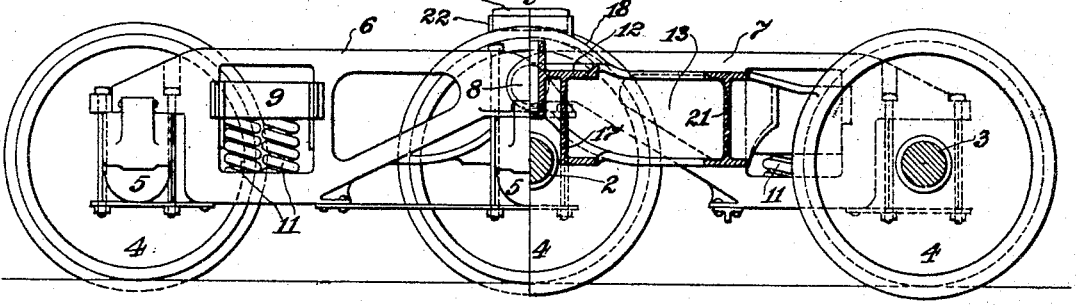
Figure 3:
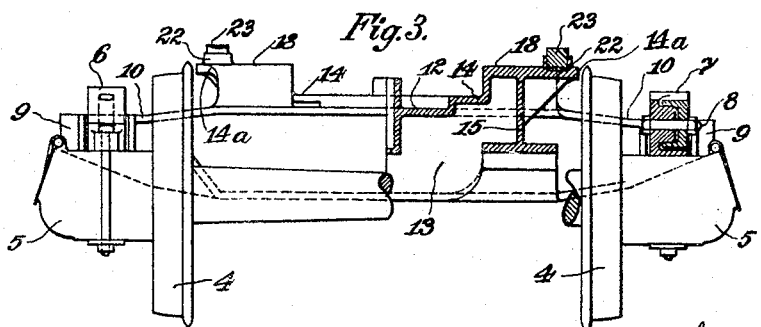

In the accompanying drawings forming a part of this specification Figure 1 is a plan view of my improved truck. Fig. 2 is a side elevation and partly in section, the section taken on line A B of Fig. 1, and Fig. 3 is an end elevation and also partly in transverse section, the said section taken on line C D of Fig. 1.

Referring now to the drawings an outer axle 1 is shown, a middle axle 2 and a third outer axle 3, and to which axles are secured in the customary manner the wheels 4, the ends of the axles being of course journaled in the journal boxes 5. The journal boxes for the axles 1 and 3 are rigidly secured to
side frames 6, while the journal boxes for the axle 2 are rigidly secured to the outer ends of corresponding side frames 7, which side frames 7 are pivotally connected to the first mentioned side frames 6 as shown at 8.

The side frames 6 and 7 are formed or provided with openings or guides to receive the outer ends of the bolster arms, which bolster will be hereinafter referred to, and located within said openings are the customary springs 11 which springs rest on the bottom members of the side frames, and support the above mentioned bolster. It will be understood however that the side frames may be of any conventional or customary form or design.

Referring now to the center bolster, 13, and as shown in plan in Fig. 1, the general shape or the center portion thereof conforms to that of the letter H, the parallel members 15 and 16 of the H being disposed wholly inside of and parallel with the side frames 6 and 7 of the truck before mentioned, and forming a part of the bolster and connecting the parallel members 15 and 16 are the main transverse members 20 and 21, the outer ends of these transverse members 20 and 21 terminating in arms 10, the ends of which pass through the openings in the side frames 6 and 7 of the truck and rest on and are supported by the springs 11 already referred to.

The load of the car body is carried on a center plate 12, which may be integral with or secured to the center bolster 13 the center plate 12 being located on the transverse central member 14 of said bolster, and the preferable shape or form of this transverse member 14 of the center bolster 13 is in cross section, that of an inverted U, the legs of the U extending down on both sides of the middle axle, clearly shown at 17, (Fig. 2) and by so forming this transverse section the necessary depth and strength is secured.

It will be readily understood, from Fig. 2, that the part in section shown at 17 and 12 is of course duplicated and would be seen in Fig. 2 if this were wholly in section, and not partly in section and partly in elevation. It will further be noted (Fig. 3) that the parallel members 15 and 16 of the H shaped center bolster are raised or humped over the middle axle as shown at 18 and are then again dropped down and connect with the main transverse members 20 and 21 as here before stated.

As it is desirable with a bolster of the particular form shown, that the side bearings be located as far apart as possible, inasmuch as the desirable and proper clearance between the side bearings on the car body and those on the truck may be more easily maintained when the side bearings are somewhat removed from the center plate and, also that the load sustained by a side bearing when the car body rocks about the center plate is less the farther out the side bearings are located, therefore in order to secure as great a spread or distance between the side bearing as possible the ends of the transverse member of the H shape center bolster extend out slightly as at 14ª, (clearly shown in Fig. 3), beyond the ends of the parallel members 15 and 16 and may under some conditions be carried out and over the tops of the middle wheels. Located on the raised or hump portion 18 and on the extension 14ª are the side bearings 23 which are shown as contained within a pocket 22, and while the bearings are preferably made in two parts for the purpose of adjustment, yet it will be readily seen that the same might be made as single bearing spots.

From the foregoing it will be readily seen that with the form of bolster employed, the side bearings are located wholly within the side frames; directly on the bolster; and also may be located wholly between the opposite wheels, and may also be located over the top of center wheels and still within the side frames and at the same time as far apart as necessary from each other and from the center plate to render the most efficient service.

Having thus described my invention what I claim as new and desire to secure by Letters Patent is:—

1. In a six wheel truck for railway cars, two side frames each being formed of two parts and pivotally connected at their inner ends, a truck bolster supported by said side frames, side bearings on said bolter and lying within said side frames.

2. In a six wheel truck for railway cars, two side frames each being formed of two parts and pivotally connected at their inner ends. said side frames being provided with openings, a truck bolster being supported in said openings, side bearings on said bolster and lying within said side frame.

3. In a six wheel truck for railway cars, side frames, a truck bolster supported thereby, said bolster having a center portion substantially H-shape in plan view, the parallel members of the H lying inside of the said side frames, and side bearings on said center portion.

4. In a six wheel truck for railway cars, side frames, a truck bolster supported thereby, said truck bolster having a center portion substantially H-shape in plan view the parallel members of the H lying inside of and parallel to the side frames, the transverse member of the H being substantially of inverted U-shape in cross section, and side bearings on the H-shape portion of the said truck bolster.

5. In a six wheel truck for railway cars, side frames, a truck bolster supported thereby, said truck bolster having a center portion substantially H-shape in plan view, the parallel members of the H lying inside of and parallel to the side frames, the transverse member of the H being substantially U-shape in cross section and adapted to straddle the middle axle, and side bearings on the H-shape portion of the said truck bolster.

6. In a six wheel truck for railway cars, side frames, a truck bolster supported thereby, said truck bolster having a center portion substantially H-shape in plan view, the parallel members of the H lying inside of and parallel to the side frames, the transverse member of the H extending outwardly beyond the parallel members thereof and side bearings on said extended portions.

7. In a six wheel truck for railway cars, side frames, a truck bolster supported thereby, said truck bolster having a center portion substantially H-shape in plan view, the parallel members of the H lying inside of and parallel to the side frames, the transverse member of the H extending outwardly beyond the parallel members thereof and side bearings on said extended portions, and a center plate on the center portion of the transverse member.

8. In a six wheel truck for railway cars, side frames, a truck bolster supported thereby, said truck bolster having a center portion substantially H-shape in plan view, the parallel members of the H lying inside of and parallel to the side frames, the transverse member of the H located over the middle axle of the truck and side bearings thereon.

9. In a six wheel truck for railway cars, side frames, a truck bolster supported thereby, said truck bolster having a center portion substantially H-shape in plan view, the parallel members of the H lying inside of and parallel to the side frames, the transverse member of the H located over the middle axle of the truck, and side bearings and a center plate on the said transverse H-shape portion.

10. In a six wheel truck for railway cars, a truck bolster having a center portion substantially H-shape in plan view, the transverse member of the H extending beyond the parallel members thereof and side bearings on said extensions.

11. In a six wheel truck for railway cars, a truck bolster having a center portion substantially H-shape in plan view the transverse member of the H extending beyond the parallel members, transverse members connecting the parallel members, diverging arms formed at the connecting portion, and side bearings on the said extensions of the transverse member of the H.

Signed at Roanoke, county of Roanoke and State of Virginia this first day of April A. D. 1914.

JOHN A. PILCHER.

Witnesses:
 Roy K. Brown,
 W. B. Kerr.